(12) United States Patent
Harrison, III

(10) Patent No.: US 7,216,920 B2
(45) Date of Patent: May 15, 2007

(54) SINGLE CONVERTIBLE TOP MECHANISM ARCHITECTURE WHICH WILL ACCEPT MULTIPLE ROOF CONFIGURATIONS

(76) Inventor: Albert W. Harrison, III, 18430 Fourway Dr., Detroit, MI (US) 48221

( * ) Notice: Subject to any disclaimer, the term of this patent is extended or adjusted under 35 U.S.C. 154(b) by 89 days.

(21) Appl. No.: 11/018,411

(22) Filed: Dec. 21, 2004
(Under 37 CFR 1.47)

(65) Prior Publication Data
US 2006/0131921 A1 Jun. 22, 2006

(51) Int. Cl.
*B60J 7/00* (2006.01)
(52) U.S. Cl. .................................... 296/108
(58) Field of Classification Search .......... 296/107.01, 296/108, 109, 114, 118, 121, 107.08, 107.09, 296/107.16
See application file for complete search history.

(56) References Cited

U.S. PATENT DOCUMENTS

| | | | |
|---|---|---|---|
| 2,895,764 A * | 7/1959 | Himka et al. | 296/117 |
| 4,828,317 A * | 5/1989 | Muscat | 296/122 |
| 6,048,021 A | 4/2000 | Sautter, Jr. | 296/117 |
| 6,199,936 B1 | 3/2001 | Mac Farland | 296/116 |
| 6,213,534 B1 | 4/2001 | Mac Farland | 296/121 |
| 6,390,532 B1 | 5/2002 | Mac Farland | 296/107.17 |
| 6,422,637 B1 | 7/2002 | Mac Farland | 296/107.15 |
| 6,439,642 B2 | 8/2002 | Mac Farland | 296/108 |
| 6,499,792 B2 | 12/2002 | MacFarland | 296/107.09 |
| 6,692,061 B1 * | 2/2004 | Willard | 296/116 |
| 6,695,384 B2 * | 2/2004 | Obendiek et al. | 296/107.09 |
| 6,722,724 B1 | 4/2004 | MacFarland | 296/107.17 |
| 6,726,269 B1 | 4/2004 | Frank | 296/117 |
| 6,796,597 B2 | 9/2004 | Mac Farland | 296/108 |
| 6,902,223 B2 * | 6/2005 | Hollenbeck et al. | 296/107.09 |

* cited by examiner

*Primary Examiner*—H Gutman
(74) *Attorney, Agent, or Firm*—Grossman, Tucker, Perreault & Pfleger PLLC

(57) ABSTRACT

A convertible top architecture for a series of vehicles of a common platform is disclosed, the vehicles having roof styles of different shapes or passenger spaces of different lengths, the top designed to cover the different length passenger spaces, the top characterized by a rear rail, top cover and backlight that are unique to each length passenger space or roof style and further including common componentry for the remainder of the top regardless of the length of the passenger space or roof style.

5 Claims, 7 Drawing Sheets

A convertible roof system for motor vehicles wherein changes to the rearmost shape of the system allows a single top mechanism to be used for different roof shapes.

SINGLE CONVERTIBLE TOP MECHANISM ARCHITECTURE WHICH WILL ACCEPT MULTIPLE ROOF CONFIGURATIONS

FIELD OF THE INVENTION

This invention is directed at convertible roof systems for motor vehicles wherein changes to the rearmost shape of the system allows a single top mechanism to be used for different roof shapes. More specifically, by utilizing a few application-specific components, the same basic mechanism may be used for convertible roofs of different styles without significant revision of the kinematic linkages.

BACKGROUND OF THE INVENTION

While rigid hardtops comprise the roof system for most motor vehicles, there is a continuing demand for retractable tops, both soft and hard, for sportier "convertible" versions. Generally, the annual volume requirements for convertibles are low and the structural requirements are different enough from the standard rigid hardtop model that a special off-line or modular production facility is employed for build-up and assembly of convertible options. Different attachment points for the various types of roofs are usually required as well as hinging or sliding mechanisms for retracting the convertible top. A portion of the trunk of the vehicle is usually employed to store the retracted top in its collapsed form.

Roof systems for most vehicles are rigid metal sections, which are welded in place and provide a portion of the structural integrity of the vehicle. It is also common in the automobile industry to employ fabric soft top convertible roofs or retractable hardtop convertible roofs, which are movable from an extended position above a passenger compartment to a retracted position near the vehicle trunk. The traditional retractable hardtop roof system employs a plurality of rigid roof panels, which can slide or be hinged and retracted for storage into the rear passenger compartment or trunk of the vehicle. A more popular convertible roof system comprises a fabric-covered frame, which can fold and retract in a like manner taking up much less space in the vehicle.

However, to accommodate a variety of roof shapes or vehicle styling, as between a "notchback" (steeply angled rear window) and "fastback" (more slanted rear window) design on a vehicle platform, separate and different mechanisms must be provided to the assembly plant. Each of these mechanisms has its own subassemblies and attendant tooling and assembly details which do not allow the use of a single convertible top mechanism to accommodate both options.

Convertible or retractable soft and hardtops may be used in vehicles having a variety of roof styles, including a shorter passenger space with only two (front) seats and a storage space behind them, or in vehicles having a longer passenger space and four seats (two in front, two in the rear). Furthermore, these vehicles may differ in the amount of space available behind the rear seat for storage of the retracted top. In order to provide the ceiling over the passenger space, retractable mechanisms including a plurality of longitudinally spaced bows supporting a top cover are provided, spaced apart from one another. Each length of top or style of roof is unique in the componentry that makes up the mechanism and in component dimensions, which when combined with low sales volume may add significant cost to the vehicle.

In order to reduce the cost of the convertible roof or top for these lower volume options, it is desirable to provide a single basic mechanism which may include only a few application-specific components which are unique to a specific style of vehicle or length of roof, and wherein most of the components of the roof system are common.

In this manner, by providing unique components for the rearmost portion of the roof system, the remainder of the forward componentry may be commonly used for a number of convertible top configurations for a vehicle platform, allowing the rear shape of the roof to be styled differently from one vehicle application to another while carrying over most of the mechanism.

There are numerous patents which address convertible soft tops and retractable hardtops for vehicles, however, in each case a top which is specially designed to accommodate only that style of body is described, rather than a common architecture with a few unique (rearmost) components which allow the top to accommodate any length or style of vehicle as provided by the present invention. U.S. Pat. Nos. 6,048,021, 6,199,936, 6,213,534, 6,390,532B1, 6,422,637B1, 6,439,642, 6,499,792, 6,722,724, 6,726,269 and 6,796,597 are directed at convertible soft tops and retractable hardtops for motor vehicles and are assigned to the assignee of the present invention and are included herein by reference.

It is an object of the present invention to provide a roof architecture that allows the installation of a mechanism including primarily common components and only a few unique or dedicated rearmost components which may close the open space of a number of similar vehicles varying primarily in roof styling or configuration.

It is further object of this invention to provide a mechanism which includes a few rearmost unique components and a majority of common components which may be used to provide roof systems of different configurations.

It is further object of this invention to provide a convertible top architecture which may provide reduced tooling and piece costs by requiring only a few unique components which allow the tops to be used in multiple vehicle applications.

These and further objects, features and advantages of the present invention will become apparent from the following description when taken in connection with the accompanying drawings which, for purposes of illustration only, show several embodiments in accordance with the present invention.

SUMMARY OF THE INVENTION

It is therefore an object of this invention to provide a convertible top which is useful to cover longer and shorter passenger compartments of vehicles and provide variations on roof styling or configuration.

In one aspect, this invention features a convertible automobile having a body including a storage well, a top movable between a raised position and folded position stored within the well, and optionally a tonneau cover mounted for movement between a closed position, covering the well in top raised and lowered positions, and an open position enabling the top to be raised and lowered. The top has a pair of spaced articulated side linkages interconnected by a plurality of spaced bows supporting a top cover. Each said linkage includes a rear rail pivoted to the body. A rear bow may be pivotally mounted on the rear rails for movement between a lowered position engaging the tonneau cover when the top is raised and a raised position adjacent the rear rail to provide clearance for the tonneau cover to open and enable raising and lowering of the top.

A unique convertible top mechanism architecture permits various permutations of the rearmost shape of a variety of roof configurations for a vehicle platform without significant revision in the kinematic linkages which make up the mechanism. This is accomplished by providing unique components for the 5th bow, the backlight and the fabric cover and by having a common architecture and mechanism for the remainder (forward portion) of the top.

In another aspect, convertible tops for motor vehicles are provided where nearly any style or configuration of top for a given vehicle platform may be provided by tops which utilize the same mechanism and componentry forward of the next to the most rearward bow (fourth bow for a typical vehicle) and utilize unique components rearward of the next to the rearmost bow to take up the differences in passenger space, styling or top length or storage space.

DETAILED DESCRIPTION OF THE PREFERRED EMBODIMENTS

Figure 1:
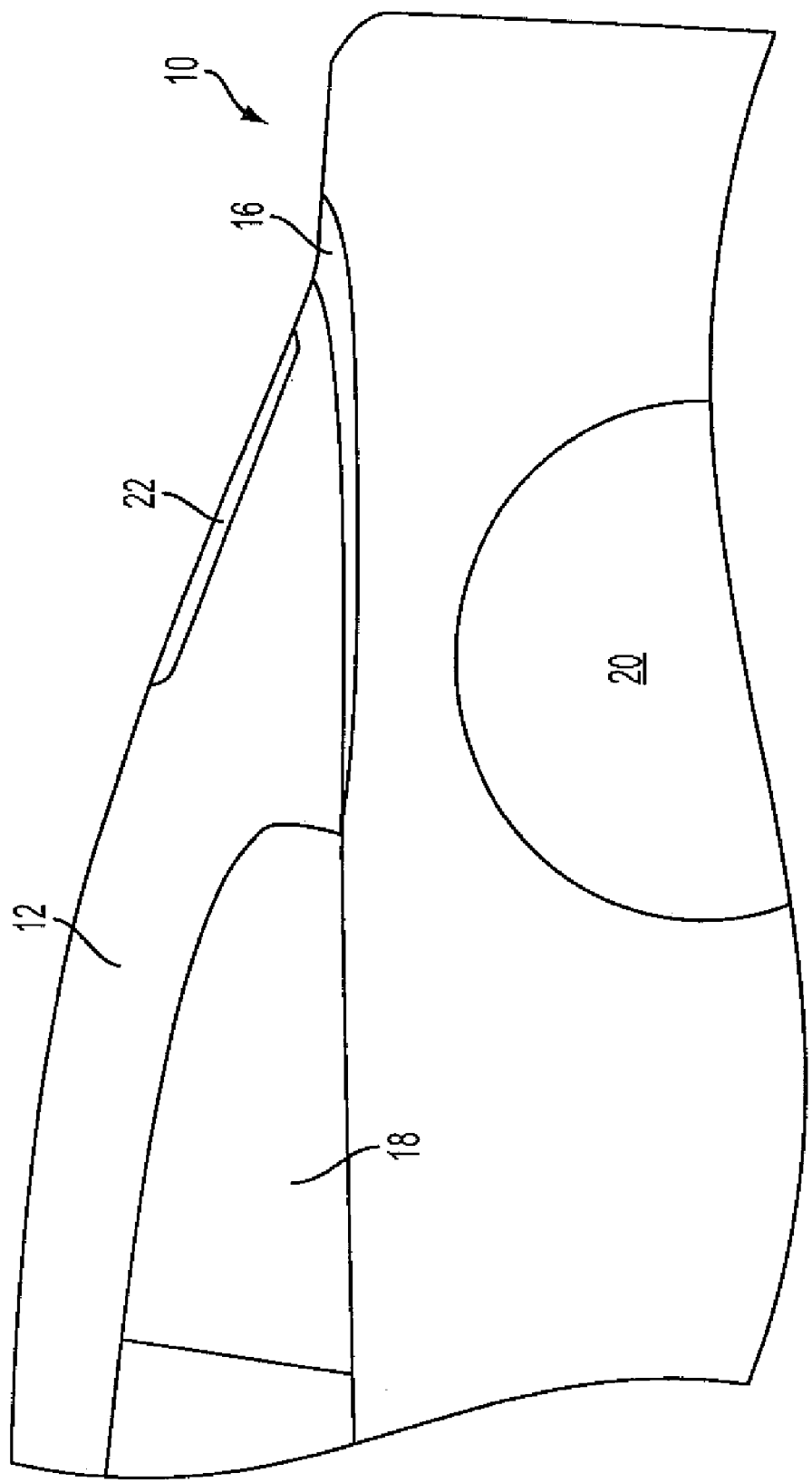
FIG. 1 is a side view of the rear section of a convertible top for a vehicle having a slanted rear roofline or "Fastback" version.
Figure 2:
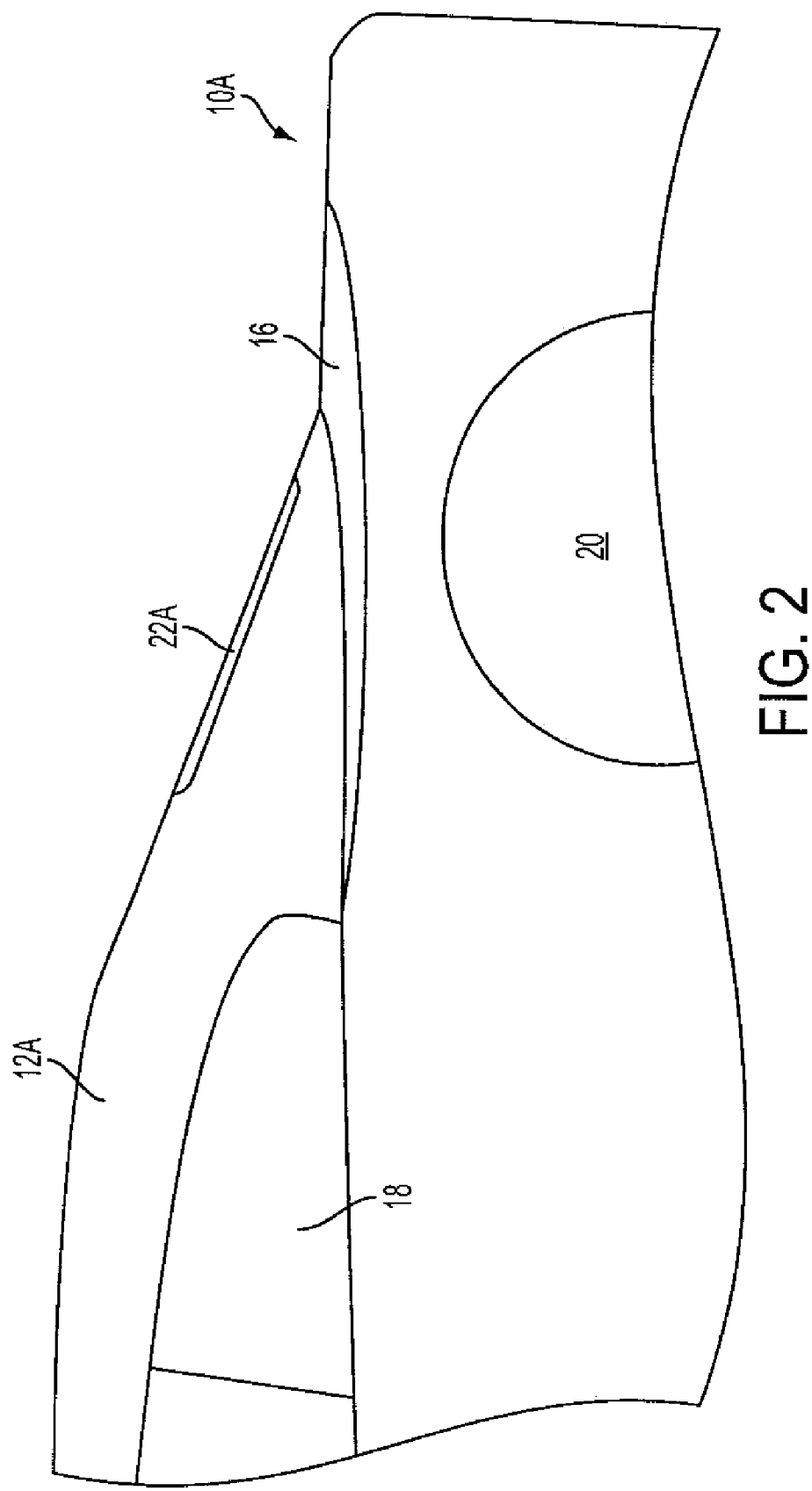
FIG. 2 is a side view of the rear section of a convertible top for a vehicle off the same basic platform having a steeper rear roofline or "Notchback" version.

FIGS. 1 and 2 show side views of two similar vehicles 10, 10A of the same vehicle platform having convertible tops 12, 12A respectively. In FIG. 1, the vehicle 10 shown is known as a "Fastback" version. This vehicle may have four seats including two full size back seats and a longer slanted rearmost section to be covered by the convertible top 12. In FIG. 2, the vehicle 10A shown is known as a "Notchback" version and is based on the same vehicle platform, but may be a two seat vehicle having a storage space or "jump seat" behind the front seat and a steeper rear roof line to provide different exterior styling. This results in a different configuration of roof system or top, particularly in the rearmost section of the top 12A. The difference in the tops 12, 12A can be seen by comparing the sloped angles of the back window or backlights 22, 22A. The present invention is directed at providing convertible tops for both vehicles illustrated, by only changing components which make up this rearmost sloped area of the tops 12, 12A.

For reference purposes, FIGS. 1 and 2 further illustrate the rear side window 18 and rear wheel opening 20 of the vehicles.

Both vehicles 10, 10A may further include a tonneau cover 16 which may articulate upward to allow the top 12, 12A, once folded, to retract into a storage area and be covered by the tonneau cover 16 when the top is in its stored position. Alternatively, no tonneau cover may be required and a cover may be attached manually, if needed.

Figure 3:
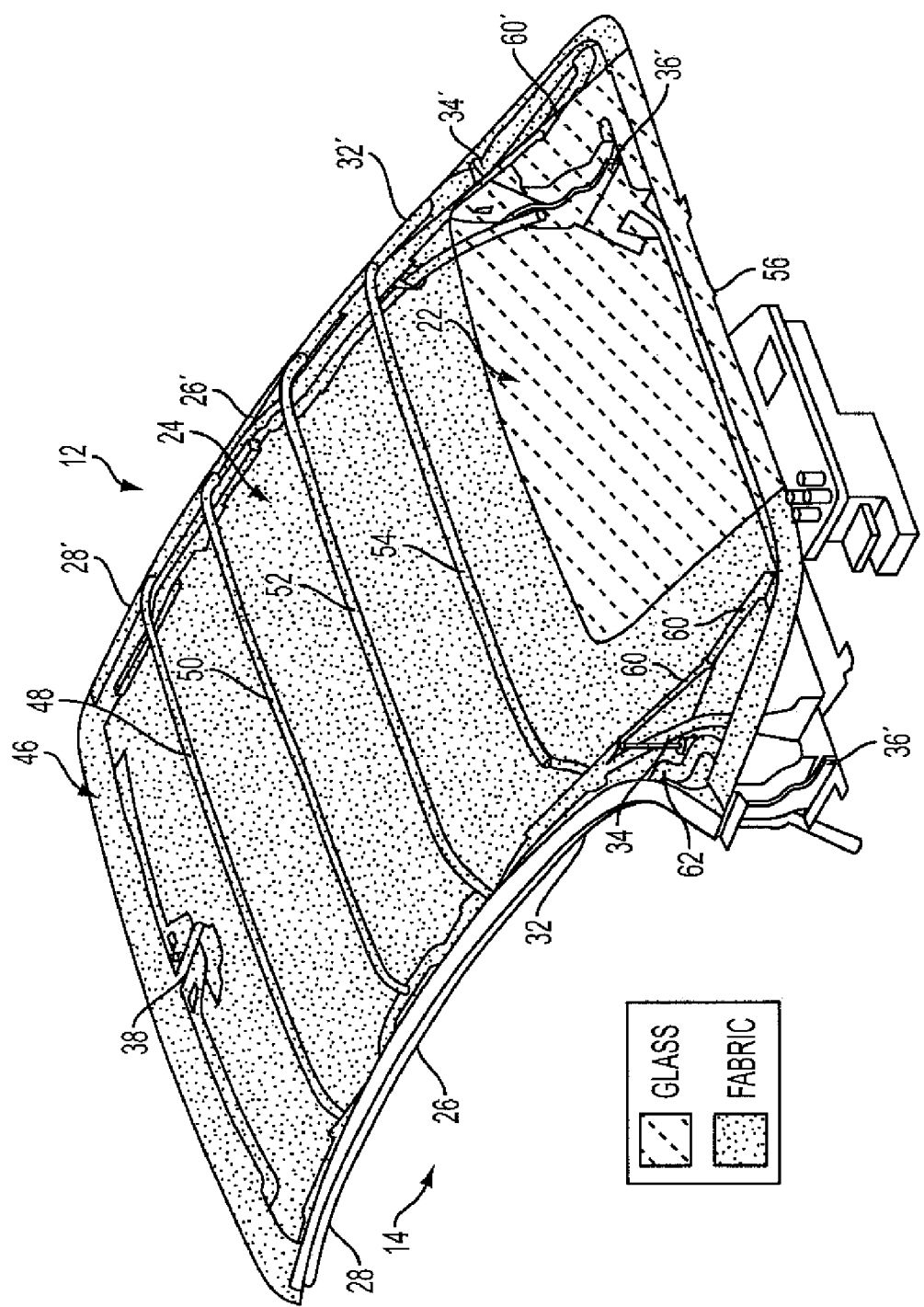
FIG. 3 is a perspective view of a convertible top in an extended position showing the various major components under a translucent top cover for illustrative purposes.

Referring now to FIG. 3 of the drawings, an automobile convertible top 12 comprises a topstack 14 which is covered by a conventional fabric cover 24 that includes a backlight 22. The fabric cover is shown herein as translucent for illustration purposes to allow the reader to see the relative position of the underlying components of the convertible top mechanism as they are interconnected and support the top 12 in an extended position over the passenger space of a vehicle. Topstack 14 includes a pair of spaced, symmetrically identical articulated side linkages composed of pivotally interconnected front rails 28, 28', middle rails 26, 26' and rear rails 32, 32' and control links 34, 34' that are pivoted to automobile body mounting brackets 36, 36'. To retract the top 12 from its extended position over the passenger space to a collapsed position in a storage well near the trunk of the vehicle, the topstack 14 articulates through a series of positions as shown in FIGS. 7A–7E (described later herein).

The articulated side linkages are interconnected by a header 46, a #1 bow 48, #2 bow 50, #3 bow 52, #4 bow 54 and a rear or #5 bow 56 which mount and support the top cover 24. The top 12 may be raised and lowered by a pair of hydraulic or electric rotary power actuators (not shown) that are operated remotely by the automobile operator in a well-known manner. Header 46 may incorporate a power-operated top latching mechanism 38 which is operable to secure the header 46 to the automobile windshield header (not shown). Thus, in the extended position the transverse support rods (header and bows #1–5) serve to tighten the fabric cover 24 as the articulated side linkages are extended.

When top 12 is raised, rear bow 56 sealingly engages a tonneau cover 16, as shown in FIG. 1, which covers a storage well for top 12 which is provided in automobile body 10. When the top is to be lowered, rear bow 56 is raised to the position shown in FIG. 7C so that the tonneau cover 16 may be opened, preferably by a hydraulic actuator. Top 12 is then folded and lowered into the well for storage in a well-known manner, after which tonneau cover 16 is closed.

FIGS. 7A–7E illustrate the articulation of the top mechanism to fold and retract the top. For the sake of clarity, only the rear section between bow #4 (54) and bow #5 (56) is shown, as the articulation of the elements forward of bow #4 (54) to fold and nest the top from the header to bow #4 into a retracted position is well known to one skilled in the art.

Figure 7A:
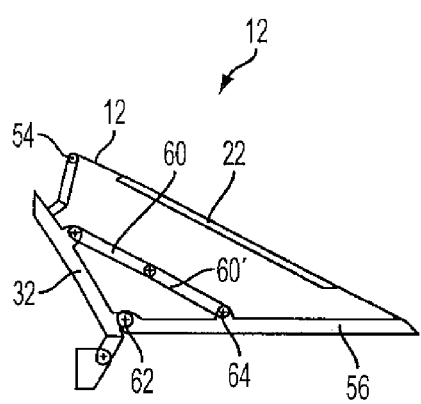
FIGS. 7A–7E illustrate the sequence of operation for the application specific components to retract and store the convertible top for the longer top version, according to the present invention.

FIG. 7A shows the rearmost section of top 12 including backlight 22 in an extended position. Also shown in FIG. 7A is the rear rail assembly 32, #5 bow control assembly linkage, made up of two portions, 60, 60', the #5 bow pivot point 62 and the #5 bow control assembly pivot point 64.

Figure 7B:
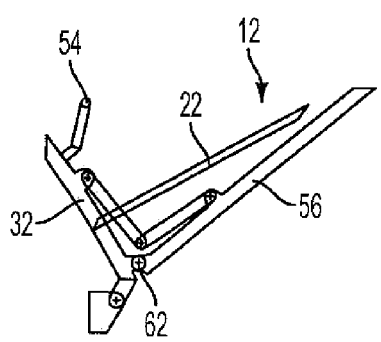

In FIG. 7B, the #5 or rear bow 56 has been raised part way, preferably by power activation, and the backlight 22 has been disconnected from the fabric top 24 at its top edge and sides so that it may lie flat as the top 12 is folded and collapsed.

Figure 7C:
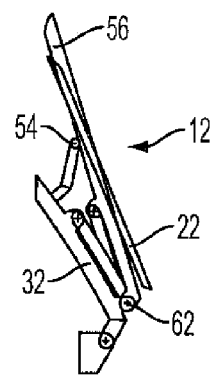

FIG. 7C shows the #5 bow 56 fully raised to a position adjacent rear rail 32. This provides clearance for a tonneau cover (not shown) to swing rearward and open the storage well to accept the folded top 12.

Figure 7D:
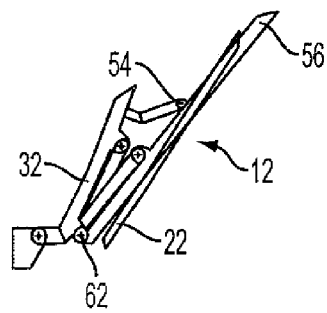

FIG. 7D shows the folded top 12 in an intermediate position being retracted and nested for storage.

Figure 7E:
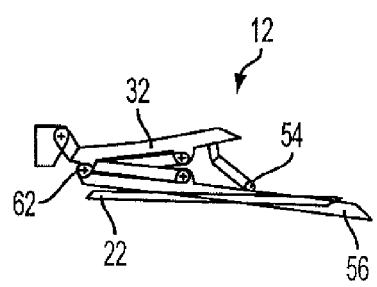

FIG. 7E shows the folded top 12 fully collapsed, folded and retracted in a storage well (not shown) such that the tonneau cover may swing forward and cover the stored top 12.

Figure 4:
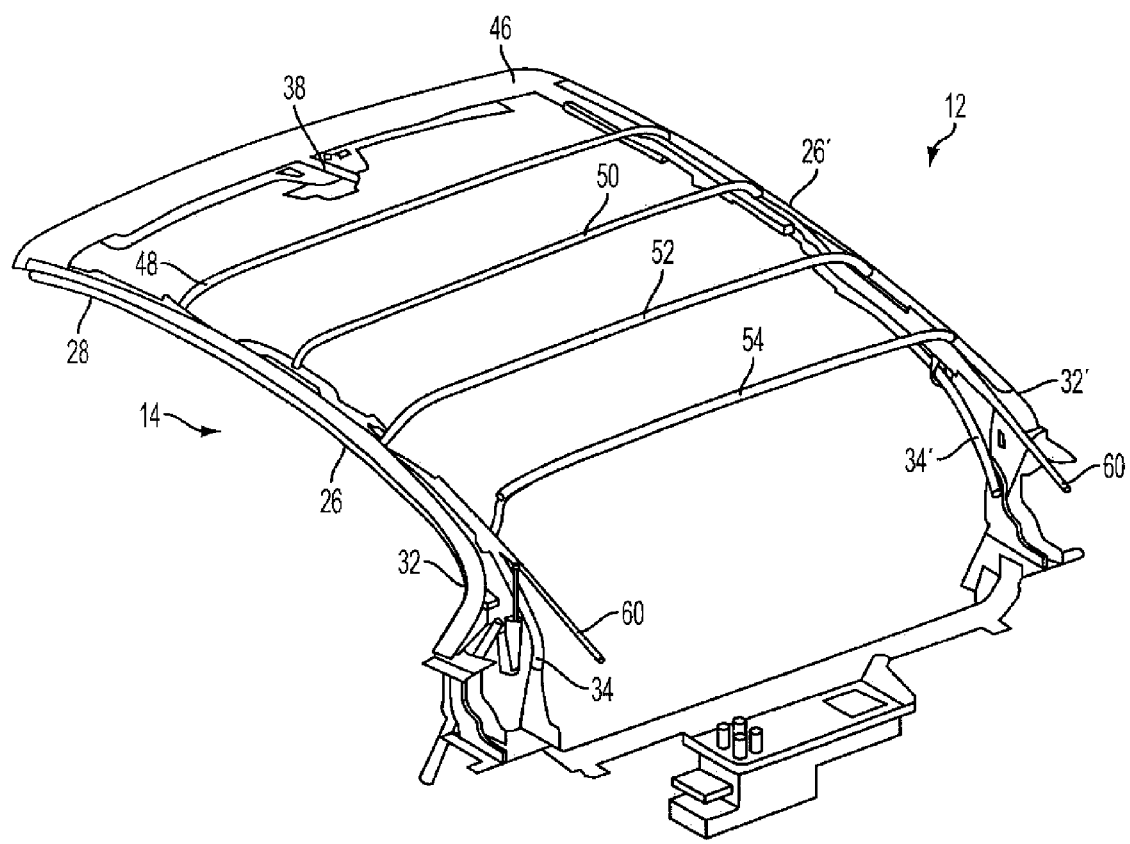
FIG. 4 is a perspective view of the convertible top of FIG. 3 showing components that are common to both shorter and longer convertible tops according to the present invention.

Turning to FIG. 4, the topstack 14 of the top 12 is shown, including all of the essential elements of the top mechanism which are common to both longer slanted 12 (Fastback) and shorter steeper 12A (Notchback) convertible tops according to the present invention. Central to the present invention is that most of the hardware, including header 46, top latching mechanism 38, #1 bow 48, #2 bow 50, #3 bow 52 and #4 bow 54 along with the front 28, 28', middle 26, 26', rear rails 32, 32' and #5 bow control linkage portion 60, 60' and assembly control linkage 34, 34', can be made common to both shorter steeper 12A and longer slanted 12 top versions, saving on tooling and inventory of separate and different components for each top version. Only a few application- or version-specific unique components for the rearmost section of the tops 12, 12A are needed, as shown in FIG. 5, to produce multiple tops of different lengths and styles to fit over longer and shorter passenger spaces for different vehicles of a single body platform.

Figure 5:
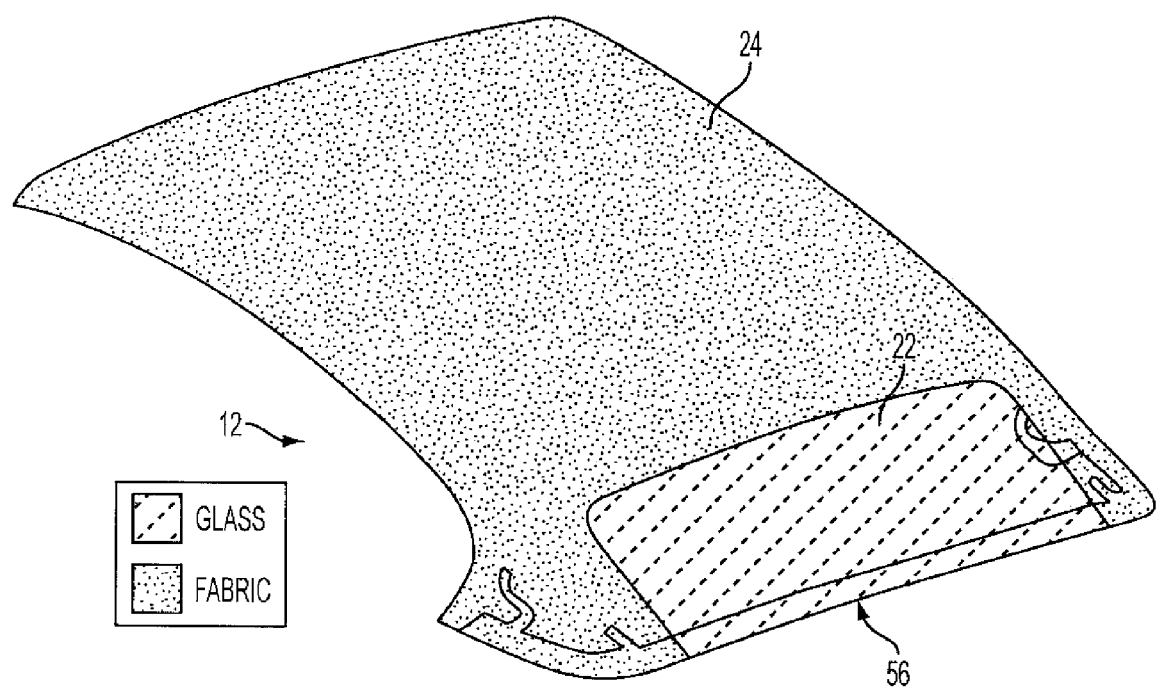
FIG. 5 is perspective view of the convertible top of FIG. 3 showing components that are unique or application-specific for longer or shorter tops according to the present invention.
Figure 6:
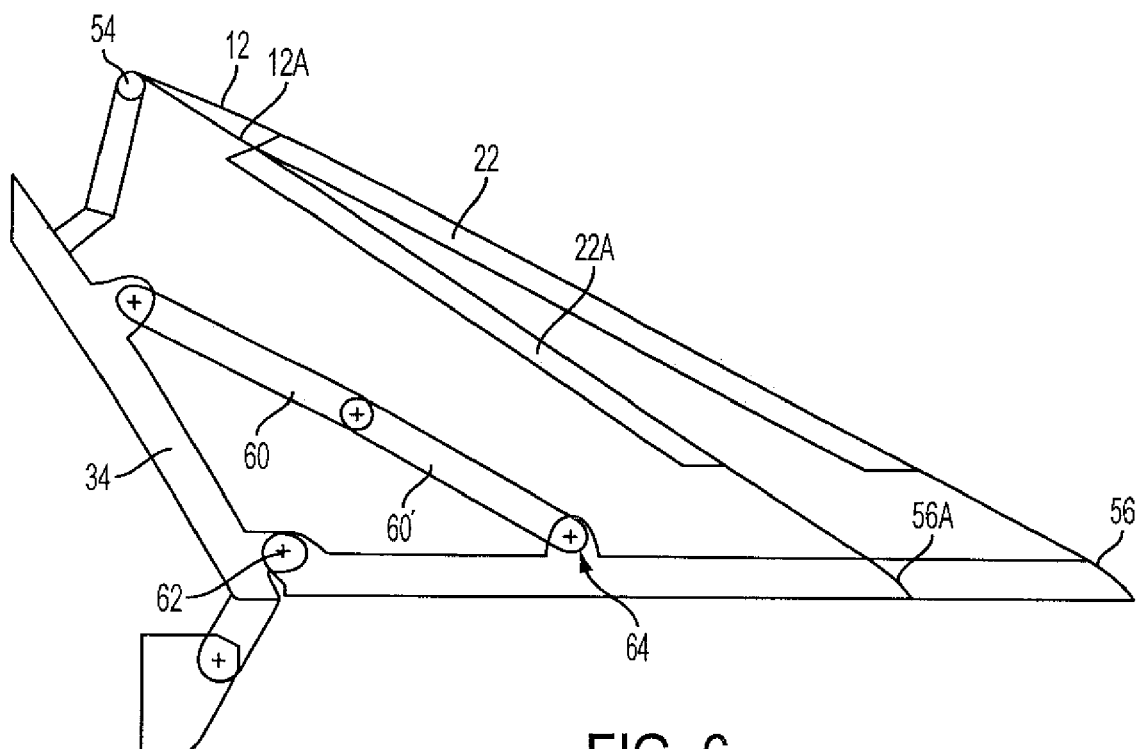
FIG. 6 is a side view of the rear sections of the shorter and longer roof version overlaid to show the relationships between application specific components for each version according to the present invention.

The unique version-specific components of top 12, shown in FIG. 5 which must have different dimensions to provide a rear section having a shorter steeper shape 12A vs. a longer slanted shape 12 convertible top (see FIG. 6 which illustrates the versions in an overlaid relationship), according to the present invention, are the fabric cover 24, the backlight 22, and the #5 bow 56, (See FIG. 5)

The dimensions of these components can be varied to provide a rear section having either a longer slanted shape 12 or a shorter steeper shape 12A convertible top when used in combination with the common components used in both top versions shown in FIG. 4. This is shown as an overlay in FIG. 6 to illustrate the relationship between the components.

Here, the common components, as in FIG. 4, are #4 bow 54, the rear rail 34, #5 bow control linkage 60, 60' and #5 bow pivot point 62. For tops 12 having a rearmost section with a longer slope and longer backlight 22, a longer (lengthwise incar) #5 bow 56 is needed. For the shorter steeper shaped top 12A having a shorter slope of greater angle, a shorter backlight 22A and shorter (fore/aft in car) #5 bow (56A) are needed.

The present invention may also be applied to hardtop convertibles of the retractable type in that only the componentry of the rearmost section of the roof (backlight, rear panel, last bow and bow linkage) need to be unique to a given body style to accommodate a difference in the length of the passenger space between longer and shorter models of the same vehicle platform. The rest of the componentry may be common.

Thus, it can be appreciated that the present invention provides a convertible top for a number of roof styles for vehicles from a common platform having shorter or longer passenger spaces or having rearmost roof sections of steeper or slanted angles by only requiring a few of the components to be application-specific or vehicle-specific and the majority of the components to be common between roof styles. The advantage of this invention over the prior methods of providing convertible roof systems becomes clear when the detailed description is taken in combination with the appended drawings. In addition, the common components of the roof systems, including most of the mechanism and kinematic linkages, may be used for convertible tops which may include a variety of roof shapes or styles and fit over a vehicle having longer or shorter passenger space.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims, one may practice the invention otherwise than as the description and drawings specifically show and describe.

What is claimed is:

1. A series of convertible tops for a common platform of automobiles having roof shapes of different styles, each automobile having a body including a storage well, said top being movable between an extended position covering a passenger space and a retracted position, stored within the well, said top having a pair of spaced articulated side linkages interconnected by a plurality of spaced bows supporting a top cover, each said side linkage including a rear rail pivoted to the body, said plurality of bows including a rear bow, the series of tops characterized by a different length rear bow, and top cover for each different roof shape or length of passenger space.

2. The series of convertible tops of claim 1, wherein the spaced articulated side linkages, spaced bows, not including the rear bow, and rear rail and linkages are common to all of the tops in the series.

3. The series of convertible tops of claim 1, further including a backlight of different length for each roof shape.

4. The series of convertible tops of claim 1, wherein said top cover comprises fabric.

5. The series of convertible tops of claim 1, wherein said automobile may further include a tonneau cover, said tonneau cover mounted for movement between a closed position, covering the well in top raised and top lowered positions, and an open position enabling the top to be raised and lowered, wherein said rear bow is pivotally mounted and engages the tonneau cover when the top is raised and wherein said rear bow may be raised to a position adjacent the rear rail to provide clearance for the tonneau cover to open and enable raising and lowering of the top.

* * * * *